Inventor
ANTHONY GEORGE KINNERLEY
ALBERT JEFFREY BROADHURST
By
Attorneys

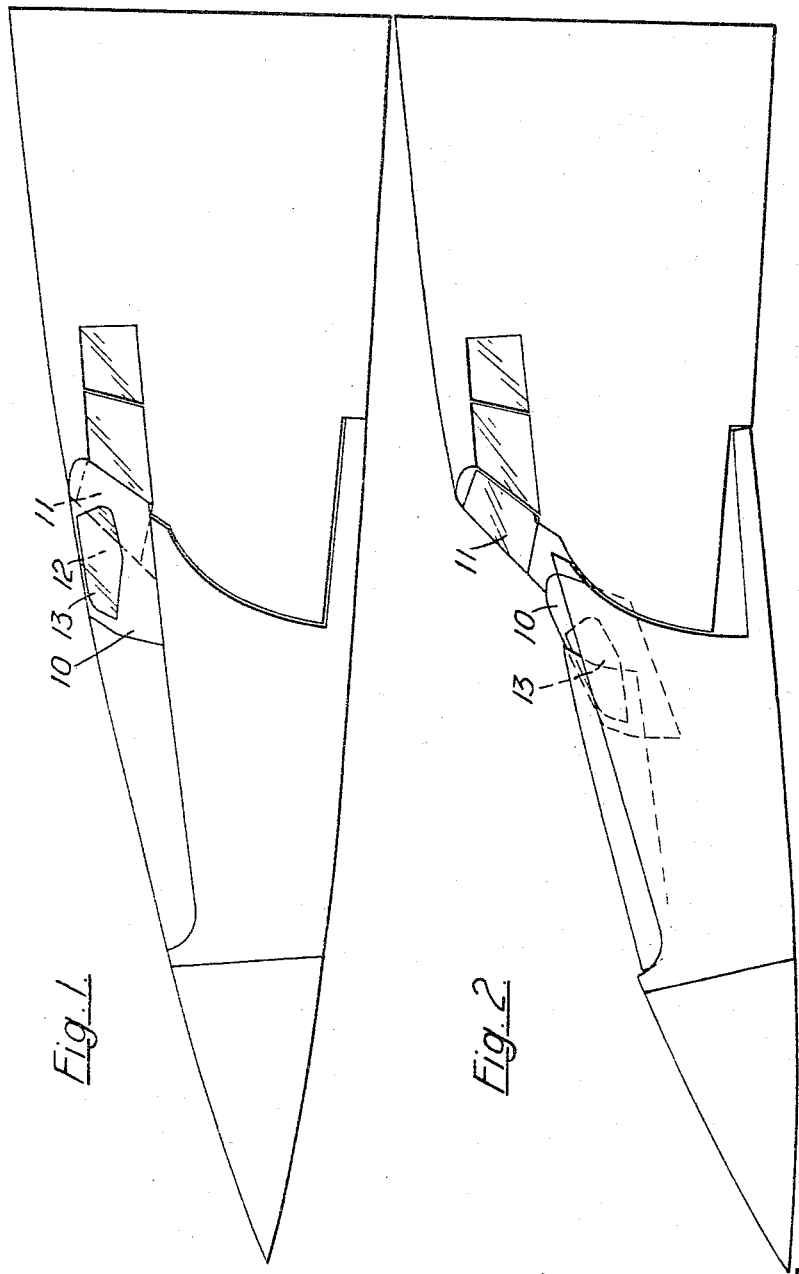

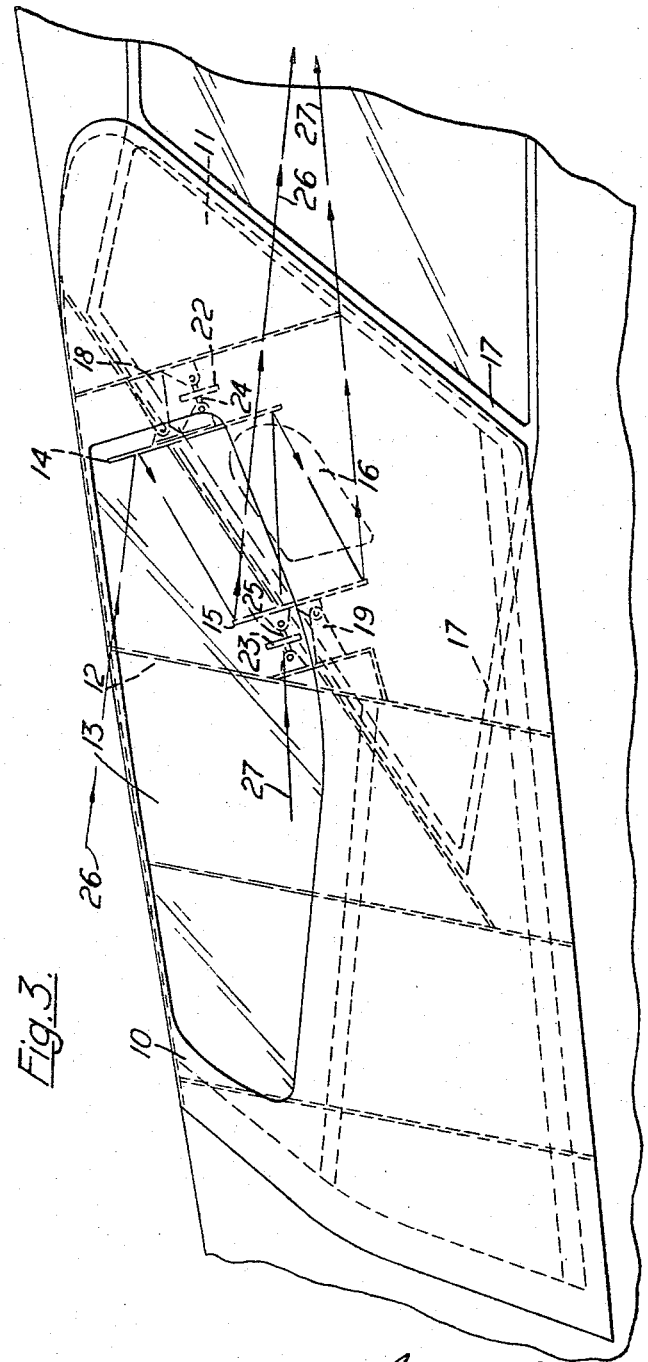

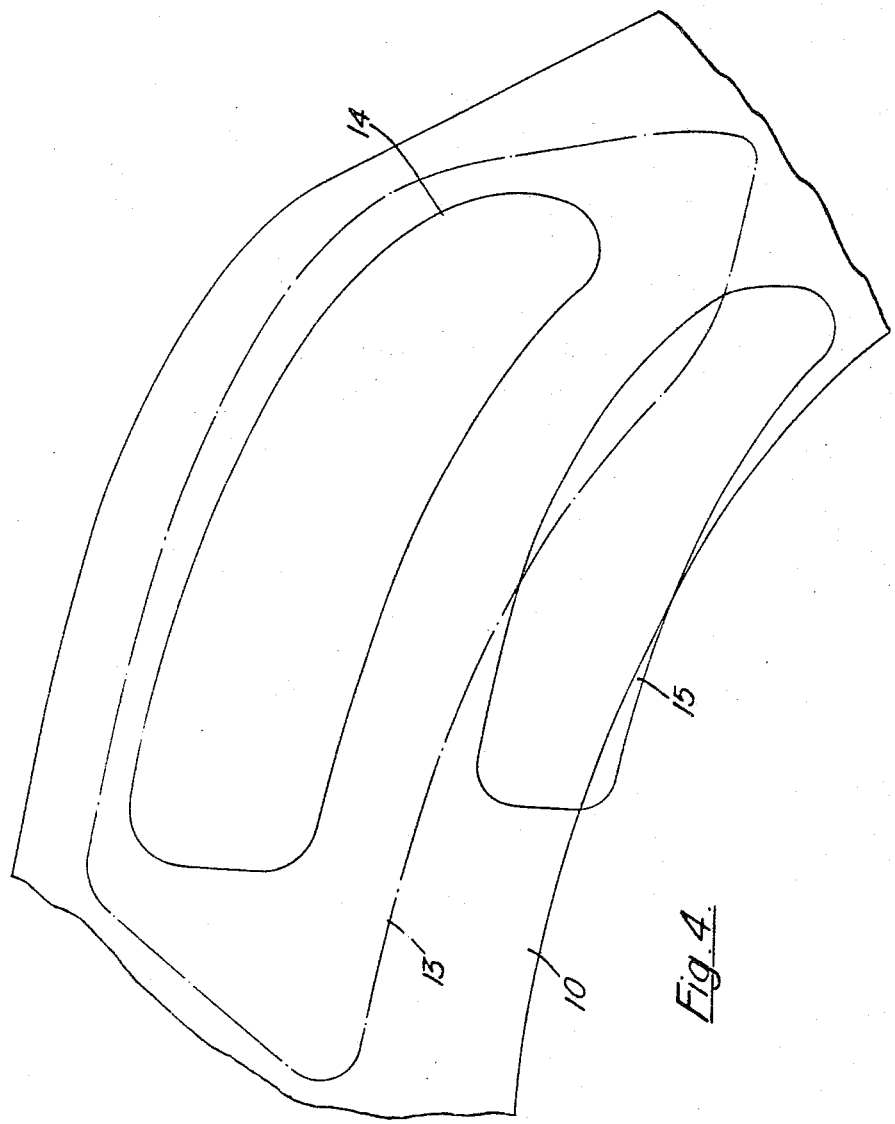

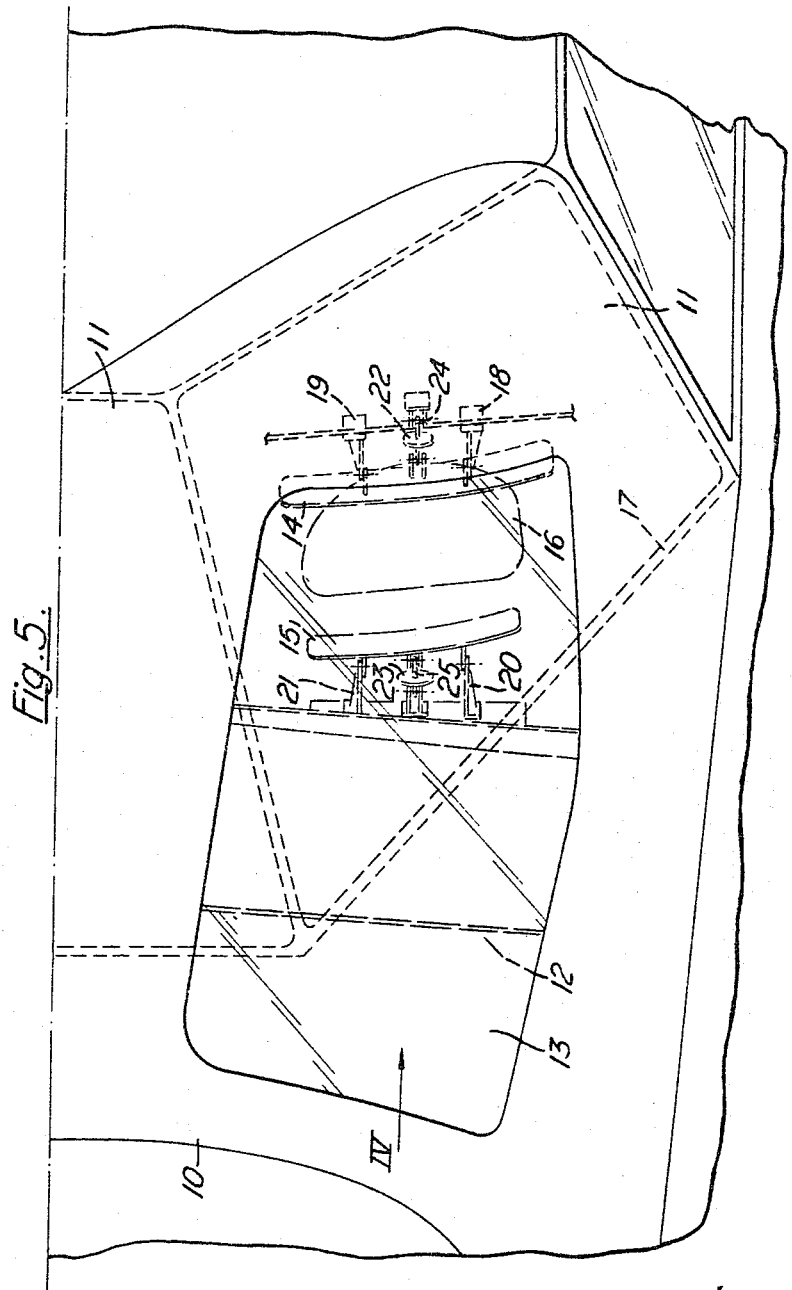

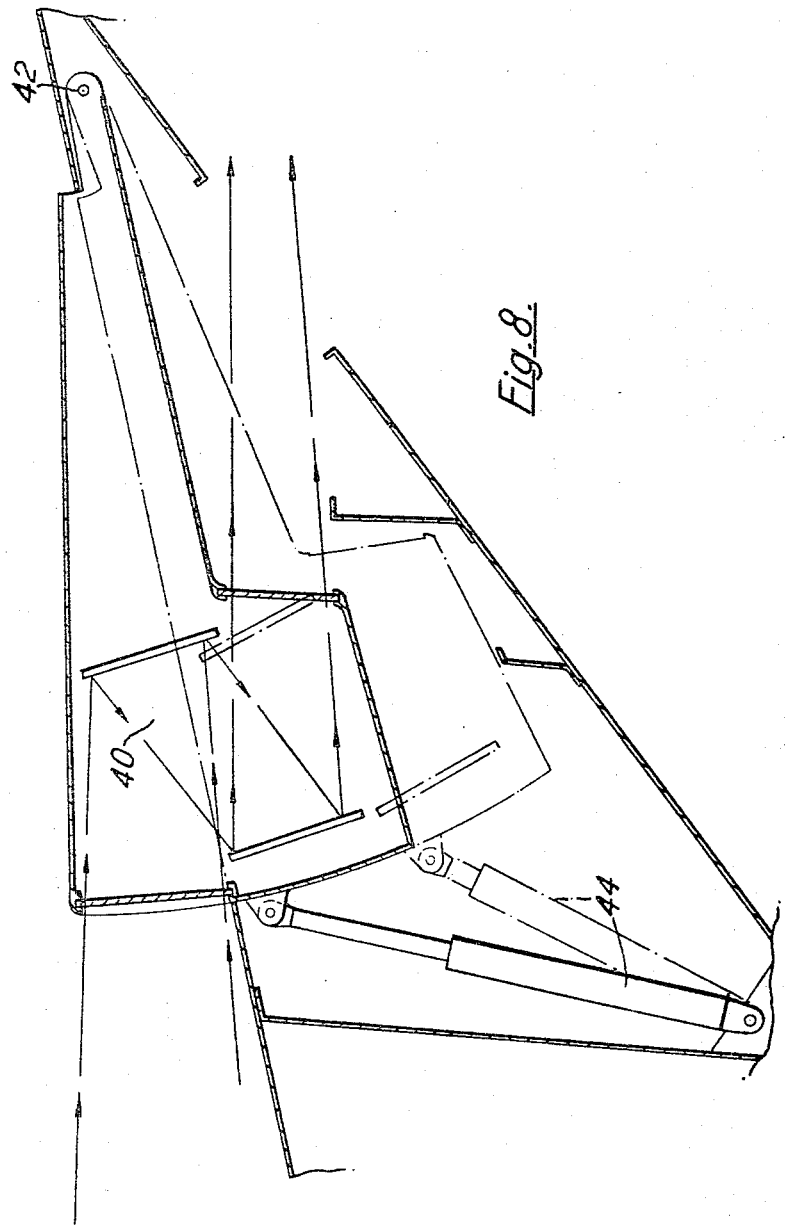

United States Patent Office 3,331,570
Patented July 18, 1967

3,331,570
AIRCRAFT
Anthony George Kinnerley, Winterbourne, Bristol, and Albert Jeffrey Broadhurst, Tickenham, near Clevedon, Somerset, England, assignors to British Aircraft Corporation (Operating) Limited, London, England, a company of Great Britain
Filed June 29, 1965, Ser. No. 467,927
Claims priority, application Great Britain, July 2, 1964, 27,416/64
2 Claims. (Cl. 244—121)

ABSTRACT OF THE DISCLOSURE

An aircraft with a windscreen and a shield mounted for movement into a position in front of the windscreen for supersonic flight; the shield having a transparent portion, and mirrors positioned to reflect light passing through such transparent portion to the pilot.

---

In an aircraft designed to operate at high speeds, for example of the order of Mach 2 or Mach 3, it is desirable, for the outline of the aircraft when flying at such speeds to be free of any projections or discontinuities. The general shape of the nose should be a sharp cone. During landing or take-off, however, it is desirable for the pilot to be able to see clearly ahead through a forwardly facing windscreen of substantial area. The windscreen may lie within the contours of the nose of the aircraft during high speed flight and may be exposed for landing and take-off by lowering the whole portion of the nose lying in front of the windscreen, or by lowering a movable panel forming part of the nose, or by lowering both the nose and the panel. Examples of such arrangements are described in our Patents 3,114,525 and 3,114,526 and application Ser. No. 369,439, filed May 22, 1964 now Patent No. 3,261,575.

The present invention is concerned with allowing the pilot a limited degree of forward vision during high-speed flight, in which circumstances the windscreen as a whole is submerged within the outline of the aircraft. If the whole area of the nose lying in front of the windscreen were formed of a transparent material, that would allow forward vision for the pilot, but such a construction is impractical.

According to the present invention, an aircraft has a windscreen; a shielding means which lies in front of the windscreen during supersonic flight, this means having at least one transparent portion; and an optical system mounted between the windscreen and the transparent portion of the shielding means to permit a forward view to be transmitted to a pilot.

The shielding means may be constituted by the nose portion of the aircraft which is pivoted about a horizontal axis to expose the windscreen. Alternatively the shielding means may be constituted by a panel lying immediately ahead of the windscreen, which panel may be slid or pivoted away from its shielding position into the nose of the aircraft.

The optical system may comprise at least two mirrors, at least one of which may be pivoted for adjustment about a horizontal axis.

Conveniently, when the shield is in its windscreen obscuring position, one of the mirrors lies rearwards of of the transparent portion with an unobstructed forward view and the other mirror lies below and forwards of the first mirror substantially in the same plane as the pilot's sight line. By this arrangement, the pilot has a limited but relatively undistorted view ahead.

To enable a co-pilot also to see ahead during flight it is a simple matter to install two optical systems of the type described one on either side of an aircraft.

Several embodiments of the aircraft are described below with reference to the accompanying drawings in which:

FIGURE 1 shows a side elevation of the nose portion of an aircraft which is in its normal forward flying position and in which the pilot sees ahead by means of the optical system.

FIGURE 2 shows the aircraft of FIGURE 1 in its position for the pilot to see directly ahead.

FIGURE 3 is an enlarged side view of the area immediately forward of the aircraft windscreen.

FIGURE 4 is a diagram looking in the direction of arrow IV in FIGURE 5 and indicates the shape and position of the mirror system compared with the transparent skin panel and the local aircraft skin contour. This is a view on the left-hand pilot's optical system and a similar system may be fitted on the right-hand side of the aircraft.

FIGURE 5 is a plan view corresponding to the side view illustrated in FIGURE 3.

FIGURE 8 shows a longitudinal section of another optical system.

Figure 7:
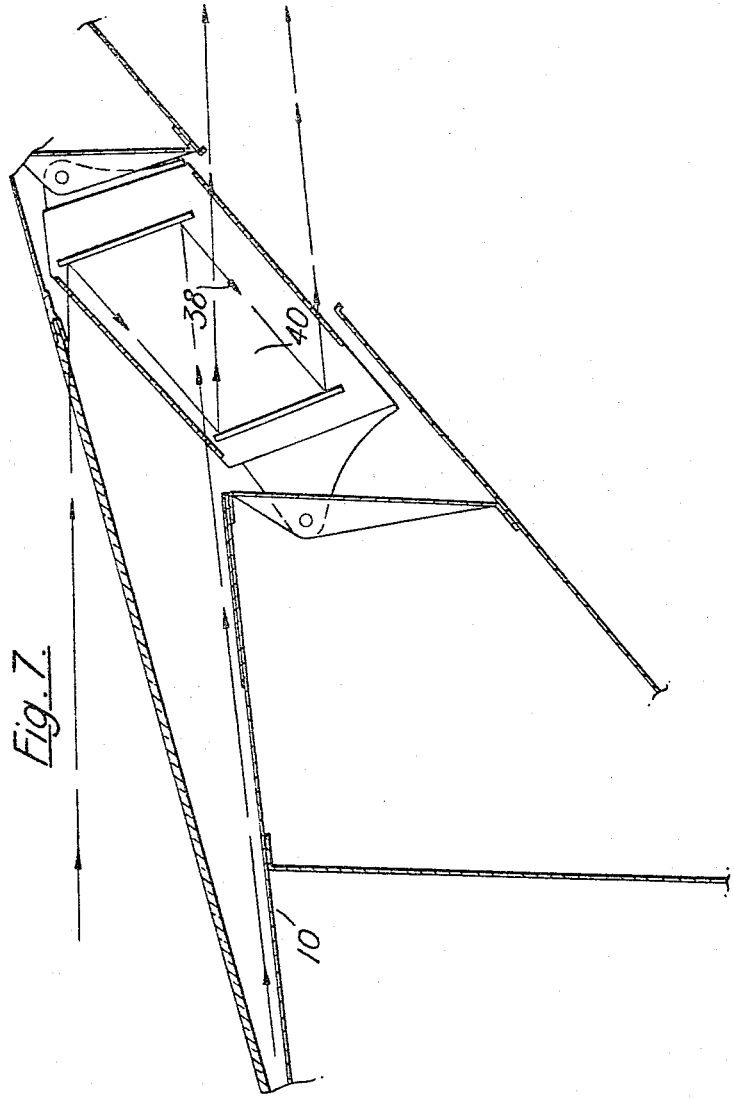
FIGURE 7 shows a longitudinal sectional view of an alternative arrangement of the optical system.

The basic elements of this arrangement are an opaque panel 10 which in certain flight conditions is raised in front of the forward facing windscreen panels 11 of an aircraft. In the opaque panel is a groove 12 whose forward end is covered with a transparent panel 13 moulded to closely follow the aircraft skin contours.

At the rear end of the groove 12 within the structure of the panel 10 is mounted a mirror 14 co-operating with a second mirror 15 also mounted within the structure of the panel 10 in the rear of the panel positioned adjacent to a windscreen panel 11.

The frames of the windscreen panels are indicated by reference numerals 17.

The mirrors 14 and 15 are mounted on spaced lugs 18, 19 and 20, 21 and are adjustable relative to the panel structure and to each other by means of hand wheels 22, 23 and screwed shafts 24, 25. In this embodiment however, the adjustment is for initial setting up and there is no adjustment of field of view during flight.

In FIGURE 3 random view lines 26, 27 indicate the path of the pilot's line of sight through the windscreen 11 and the window 16, being reflected by mirrors 14 and 15 and passed through the transparent panel 13 on a high level but substantially parallel to the initial path.

The apparent passage of the rays 26, 27 through the mirrors is due to the fact that the drawing is a side elevation of mirrors of curved outline; an indication of their forms may be derived from FIGURES 4 and 5.

Figure 6:
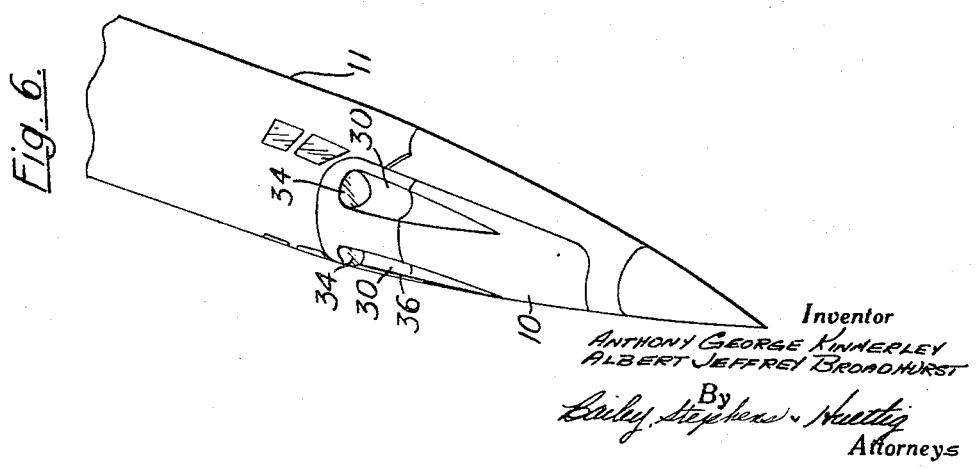
FIGURE 6 shows in perspective another embodiment.

In an alternative embodiment as shown in FIGURE 6, the panel has a flute 30 serving as a viewing channel, the rear end of the flute being terminated by the small transparent portions 34. This would give rise to a slight discontinuity in the contour of the aircraft. As an alternative, the flutes can be covered by an elongated transparent panel 36 merging smoothly with the outline of the nose, the panel being approximately triangular in shape and being curved in cross-section.

The two mirrors may be mounted on a box 40, as seen in FIGURE 7, the rear face 38 of the box being parallel to the windscreen and being formed at least partly by a transparent panel through which the pilot can look towards the lower mirror.

In another alternative arrangement, seen in FIGURE 8, the two mirrors and the small transparent panel may be fitted in a box which is raised out of the fuselage contours whenever the pilot requires forward vision. When no forward vision is required, the box 40, including the transparent panel, lies within the fuselage contour. The box may be pivoted to the nose about a horizontal axis 42 lying well behind the upper mirror. The upward and downward movement of the box may be controlled by a fluid-operated jack 44.

We claim:

1. An aircraft having a windscreen which is rigidly mounted in the aircraft to lie inclined to the general contour of the aircraft, a panel which has a transparent portion, lies generally ahead of the windscreen, and is mounted on the aircraft by a means which permits the panel to be moved between a first position which it occupies in a first flight condition and wherein it conceals the windscreen and lies smoothly continuous with the general contour of the aircraft, and a second position which it occupies in a second flight condition and wherein the windscreen is exposed so that a pilot in the aircraft can see ahead directly through the windscreen, the aircraft further having first and second mirrors mounted on the panel to lie between the panel and the windscreen in the said first position, the arrangement being such that when the panel is in its first position, the transparent portion lies generally higher than the direct line of vision of the pilot through the windscreen and the first mirror lies directly rearwards of the said transparent portion, and is inclined to reflect light passing in a rearward direction through the transparent portion in a forwardly downwards direction on to the reflecting surface of the second mirror, which second mirror lies directly in line with the direct line of vision of the pilot through the windscreen and is inclined to reflect the light from the first mirror directly rearwards through the windscreen.

2. An aicraft as claimed in claim 1 in which the nose of the aircraft which lies ahead of the windscreen is pivotally mounted on the aircraft so that it can be rotated to lie inclined forwardly downwards relatively thereto in the second flight condition, the nose having provision for receiving at least part of the panel when the nose is tilted downwards, and in which the two mirrors are adjustably rotatably mounted on respective lugs which are rigidly associated with the panel.

References Cited

UNITED STATES PATENTS

| | | | |
|---|---|---|---|
| 2,155,164 | 4/1939 | Harris | 88—68 |
| 2,674,921 | 4/1954 | Williams | 88—70 |
| 2,778,586 | 1/1957 | Nyerges et al. | 244—121 |
| 3,114,526 | 12/1963 | Morgan | 244—121 |
| 3,261,575 | 7/1966 | Lock | 244—121 |

FOREIGN PATENTS 815,134    6/1959    Great Britain.

OTHER REFERENCES

"Aircraft Engineering," November 1963, page 329, TL501 A55.

MILTON BUCHLER, *Primary Examiner.*

T. W. BUCKMAN, *Assistant Examiner.*